US010192247B2

(12) United States Patent
Roh et al.

(10) Patent No.: US 10,192,247 B2
(45) Date of Patent: Jan. 29, 2019

(54) METHOD FOR BUYING AND SELLING GOODS AND SHOPPING SUPPORT SYSTEM SUPPORTING THE SAME

(75) Inventors: Jung-Hwa Roh, Bucheon-si (KR); Jang-Hyuk Lee, Seoul (KR); Jeong-Hwan Kim, Seoul (KR)

(73) Assignee: KOREA INFORMATION & COMMUNICATIONS CO., LTD., Seoul (KR)

( * ) Notice: Subject to any disclaimer, the term of this patent is extended or adjusted under 35 U.S.C. 154(b) by 837 days.

(21) Appl. No.: 13/405,761

(22) Filed: Feb. 27, 2012

(65) Prior Publication Data

US 2012/0221440 A1   Aug. 30, 2012

(30) Foreign Application Priority Data

Feb. 25, 2011   (KR) .................. 10-2011-0017271
Feb. 25, 2011   (KR) .................. 10-2011-0017443

(51) Int. Cl.
  *G06Q 30/00*   (2012.01)
  *G06Q 30/06*   (2012.01)

(52) U.S. Cl.
  CPC .................... *G06Q 30/06* (2013.01)

(58) Field of Classification Search
  CPC .............. G06Q 30/0635; G06Q 30/0637
  USPC ...................................... 705/26, 27
  See application file for complete search history.

(56) References Cited

U.S. PATENT DOCUMENTS

| 8,403,215 B2* | 3/2013 | Aihara | G06K 7/1095 |
| | | | 235/383 |
| 8,418,919 B1* | 4/2013 | Beyda | G07G 1/0054 |
| | | | 235/375 |
| 2002/0133415 A1* | 9/2002 | Zarovinsky | G06Q 10/087 |
| | | | 705/27.1 |

(Continued)

FOREIGN PATENT DOCUMENTS

| KR | 10-2006-0014565 A | 2/2006 |
| KR | 10-2006-0018792 A | 3/2006 |

(Continued)

OTHER PUBLICATIONS

Eglinton, Chuck; "Mobile Check In: Your Wireless Phone becomes your Paperless Boarding Pass", ChuckEgg.com, Aug. 8, 2010, 8 pgs; Internet Archive Wayback Machine; ChuckEgg.com. (Year: 2010).*

*Primary Examiner* — Robert M Pond
(74) *Attorney, Agent, or Firm* — Jefferson IP Law, LLP

(57) ABSTRACT

Provided are a goods buying and selling method for buying goods through offline shopping and a shopping support system supporting the same. A buyer collects delivery information for delivery of bought goods based on short-range wireless communication using his or her own terminal. The collected delivery information includes any one of information about a destination to which bought goods are to be delivered and buyer identifier information, and information about the bought goods, and at least one of a payment terminal, a merchant server and a relay server requests delivery of the bought goods from a delivery server based on the collected delivery information. In addition, the buyer collects goods purchase information recorded in recording media arranged in an offline store using his or her own terminal, and pays for desired bought goods based on the collected goods purchase information.

12 Claims, 10 Drawing Sheets

(56) References Cited

U.S. PATENT DOCUMENTS

| | | | |
|---|---|---|---|
| 2006/0178986 A1* | 8/2006 | Giordano | G06Q 20/04 705/40 |
| 2008/0167961 A1* | 7/2008 | Wentker et al. | 705/14 |
| 2008/0189186 A1 | 8/2008 | Choi et al. | |
| 2010/0114739 A1* | 5/2010 | Johnston | 705/27 |
| 2010/0287057 A1* | 11/2010 | Aihara | G06K 7/1095 705/16 |
| 2011/0119156 A1 | 5/2011 | Hwang et al. | |
| 2011/0191160 A1* | 8/2011 | Blackhurst et al. | 705/14.38 |

FOREIGN PATENT DOCUMENTS

| | | |
|---|---|---|
| KR | 10-0749884 B1 | 8/2007 |
| KR | 10-2007-0111895 A | 11/2007 |
| KR | 10-2008-0010083 A | 1/2008 |
| KR | 10-2010-0009971 A | 1/2010 |
| KR | 10-1014781 B1 | 2/2011 |

\* cited by examiner

METHOD FOR BUYING AND SELLING GOODS AND SHOPPING SUPPORT SYSTEM SUPPORTING THE SAME

PRIORITY

This application claims priority from Korean Patent Application No. 10-2011-0017271, and 10-2011-0017443 filed in the Korean Intellectual Property Office on Feb. 25, 2011, the entire disclosure of both of which is hereby incorporated by reference.

BACKGROUND OF THE INVENTION

Field of the Invention

The exemplary embodiments generally relate to a method for buying and selling goods and a shopping support system were supporting the same. More particularly, exemplary embodiments relate to a goods buying and selling method for buying goods through offline shopping and a shopping support system supporting the same.

Description of the Related Art

Generally, when buying goods offline, buyers may visit shops or stores, select desired goods, and pay for the selected goods. The buyers may want to have the bought goods delivered to desired places using the shipping or delivery service provided by the shops or stores, or may carry the bought goods to the desired places in person.

For example, when buying goods from discount stores, buyers may put the goods in a cart or a basket in person, move it to the counter, and pay for the bought goods. After completing the payment, the buyers may put the goods in a basket or a bag and carry it in person, or may take advantage of the shipping or delivery service provided by the discount stores.

Therefore, stores (e.g., offline stores) that sell goods offline are generally required not only to secure the space sufficient to exhibit goods to sell, but also to be furnished with carts and/or baskets to be used by buyers. All the way until they finish buying goods, the buyers should carry the bought goods using a cart or a basket available in the stores.

In addition, the stores should build a system for providing a shipping or delivery service for the goods bought by buyers. In order to take advantage of the shipping or delivery service, the buyers should carry the goods they bought, up to the shipping or delivery reception desk in person.

However, in the case of online shopping where buyers buy goods online, the buyers may conveniently receive the bought goods at desired places without the need to carry them in person. Therefore, the online shopping may be an alternative of reliving the inconveniences of the offline shopping. Due to the current excellent communications infrastructure, the application range of the online shopping is getting wider and wider.

For example, the online shopping includes a procedure in which buyers may determine desired goods based on the shopping information provided by shopping malls, and then pay an amount of money corresponding to the bought goods. Of course, if necessary, the buyers should register the address to which the bought goods are to be delivered. However, in most cases, this procedure may also be omitted, if the buyers have ever bought goods from the shopping malls before.

However, compared to the offline shopping, the online shopping may have a relatively higher ratio of exchange and/or return of goods because buyers cannot determine the goods in person.

Therefore, in order to increase the buyers' offline shopping satisfaction, it is necessary to relieve the burden that the buyers should carry the bought goods during shopping.

SUMMARY OF THE INVENTION

An aspect of exemplary embodiments of the present invention is to provide a new goods buying and selling method in which a buyer may buy desired goods without moving the substance of goods he or she will buy, in person during offline shopping, and a shopping support system supporting the same.

Another aspect of exemplary embodiments of the present invention is to provide a goods buying and selling method for collecting information needed to buy goods exhibited for offline shopping, using a buyer terminal, and a shopping support system supporting the same.

Further another aspect of exemplary embodiments of the present invention is to provide a method in which an offline shopping store arranges recording media in which information needed to buy goods is recorded, and provides shopping information about bought goods to a buyer using the recording media, and a shopping support system supporting the same.

Yet another aspect of exemplary embodiments of the present invention is to provide a goods buying and selling method for supporting a payment on bought goods based on goods information collected from an offline store, and a shopping support system supporting the same.

Still another aspect of exemplary embodiments of the present invention is to provide a goods buying and selling method for simplifying a procedure for receiving a shipping or delivery service for the goods sold in an offline store, and a shopping support system supporting the same.

Still another aspect of exemplary embodiments of the present invention is to provide a goods buying and selling method for transferring shipping or delivery information for bought goods to a payment terminal along with collected information about the bought goods, when a buyer pays for the bought goods using a buyer terminal, and a shopping support system supporting the same.

In accordance with one aspect of the present invention, there is provided an offline shopping support system supporting buying and selling of goods in an offline store. The system includes a delivery request device corresponding to at least one of a payment terminal, a merchant server and a relay server, for receiving delivery information including any one of destination information and buyer identification information and information about bought goods from a buyer terminal using short-range wireless communication, and requesting a delivery server to deliver the bought goods corresponding to the information about the bought goods included in the received delivery information, based on the destination information included in the received delivery information or destination information that is set in advance in association with the buyer identification information.

In accordance with another aspect of the present invention, there is provided a method for supporting offline shopping in any one of a payment terminal, a merchant server and a relay server constituting an offline shopping support system. A delivery request device corresponding to at least one of the payment terminal, the merchant server and the relay server, receives delivery information including any one of destination information and buyer identification information and information about bought goods from a buyer terminal using short-range wireless communication, and requests a delivery server to deliver the bought goods corresponding to the information about the bought goods included in the received delivery information, based on the destination information included in the received delivery information or destination information that is set in advance in association with the buyer identification information.

BRIEF DESCRIPTION OF THE DRAWINGS

The above and other, features and aspects of certain exemplary embodiments of the present invention will be more apparent from the following description taken in conjunction with the accompanying drawings, in which.

Throughout the drawings, the same drawing reference numerals will be understood to refer to the same elements, features and structures.

DETAILED DESCRIPTION OF EXEMPLARY EMBODIMENTS

Figure 1:
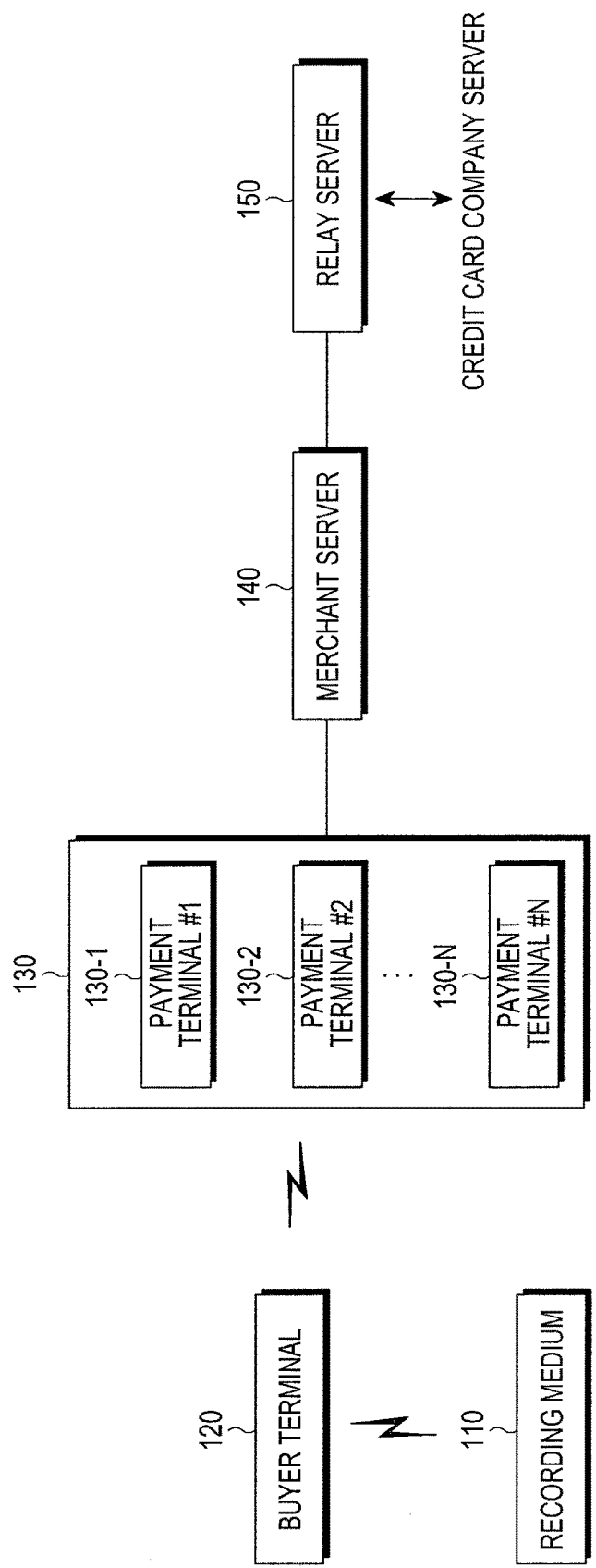
FIG. 1 shows an offline trading system according to an exemplary embodiment of the present invention.

Exemplary embodiments of the present invention will now be described in detail with reference to the accompanying drawings. In the following description, specific details such as detailed configuration and components are merely provided to assist the overall understanding of exemplary embodiments of the present invention. Therefore, it should be apparent to those skilled in the art that various changes and modifications of the embodiments described herein can be made without departing from the scope and spirit of the invention. In addition, descriptions of well-known functions and constructions are omitted for clarity and conciseness.

In the following description of exemplary embodiments of the present invention, a new offline shopping technique, a shipping/delivery reception technique, and a combination of a newly proposed offline shopping method and a shipping/delivery service will be described in detail by way of example.

For example, an offline shopping technique newly proposed by an exemplary embodiment of the present invention may include a procedure in which a buyer collects information (hereinafter referred to as 'goods purchase information') about the goods he or she wants to buy in an offline store, and pays an amount (or purchase amount) of money corresponding to the bought goods based on the collected goods purchase information. The term 'goods purchase information' as used herein may refer to information needed to process a payment on the bought goods. For example, the goods purchase information may include identification information of goods and purchase quantity and unit price information of the goods.

To this end, an exemplary embodiment of the present invention collects goods purchase information from recording media arranged in an offline store using a terminal (hereinafter referred to as a 'buyer terminal') of a buyer. Preferably, the recording media may be arranged along with their associated actual goods.

The recording media have no limitation on their types as long as they can provide goods purchase information to a buyer terminal. However, the goods purchase information should not be provided to the buyer terminal, contrary to the buyer's intent.

As for the recording media, at least one of non-communication-type recording media and communication-type recording media may be typically considered. The former recording media may provide information in the form of at least one of one-dimensional, two-dimensional and three-dimensional barcode images, while the latter recording media may provide information stored therein in the form of an electrical signal upon request. In addition, direct communication-type recording media may be used, which may provide information via a cable.

In the case of the non-communication-type recording media, information about goods may be provided by displaying images such as Quick Response (QR) codes on the recording media and capturing the images using a camera mounted in a buyer terminal. In this case, the buyer terminal should have an application for extracting desired information from the images captured by the camera. Preferably, the images may be displayed on target goods or their packing.

In the case of the communication-type recording media, information about goods may be provided based on short-range wireless communication such as Bluetooth communication and Near Field Communication (NFC). Preferably, in this case, a buyer terminal may include hardware (HW) and software (SW) configurations for supporting the short-range wireless communication, and an application for extracting collected information about goods by the short-range wireless communication.

As various techniques have been proposed for information sharing as described above, a required information sharing norm needs to be agreed in advance between the buyer terminal and the recording media.

In accordance with an exemplary embodiment of the present invention, to facilitate collection of goods purchase information, the buyer terminal should include not only high-performance hardware supporting various communication schemes, but also software supporting collection of goods purchase information and payment and delivery based on the collected goods purchase information. For example, the buyer terminal may be a buyer's smart phone in which an application needed to perform a function proposed by an exemplary embodiment of the present invention is installed, or may be a dedicated terminal prepared in an offline store (e.g., affiliated store) and allowed to be used by buyers.

In the following description of an exemplary embodiment of the present invention, an amount of money corresponding to the bought goods is paid based on goods purchase information collected by the buyer terminal.

For example, a buyer may provide goods purchase information collected by his or her buyer terminal, information needed for payment, and information needed for delivery, not only to a payment terminal but also to other devices having payment rights.

To this end, a device capable of processing a payment (operation), including the buyer terminal and the payment terminal, may support short-range wireless communication such as Bluetooth communication and NFC communication. The device (hereinafter referred to as a 'payment processing device') capable of processing payment, which is installed for a payment, may process a payment corresponding to the bought goods based on the goods purchase information provided from the buyer terminal, using a predetermined payment method. The payment processing device may be at least one of a payment terminal, a merchant server, and a relay server.

When determining an amount of money corresponding to bought goods, the payment processing device may reflect a pricing policy based on event information provided by the affiliated store. Information about payment means for payment processing may be provided from the buyer terminal to the payment processing device, or may be registered in advance in at least one device involved in processing the payment. If information about payment means is registered in advance in a specific device, authentication information for the use of the pre-registered information about payment means should be provided from the buyer terminal. For example, the authentication information is identification information of the buyer, and may include a phone number of the buyer or the information the buyer has set in advance.

Upon acquiring the goods purchase information and the information about payment means provided from the buyer terminal, and event information capable of being applied when necessary, the payment processing device may process a payment for the bought goods based on the acquired information.

In addition, an exemplary embodiment of the present invention provides a technique for requesting delivery of goods bought by the buyer. For an exemplary case where a buyer buys goods and pays for the bought goods, a technique proposed by an exemplary embodiment of the present invention may be applied. Information for delivery of the bought goods should necessarily be shared.

If the payment technique and the delivery technique proposed by an exemplary embodiment of the present invention are applied together, it is preferable for the buyer terminal to transmit delivery information to a delivery request device when transmitting goods purchase information to the payment processing device. The reason is because reception of a request for a delivery service should be achieved after the payment of an amount of money corresponding to the bought goods is completed. For the payment processing device and the delivery request device, the same or different devices may be assigned.

Exemplary embodiments of the present embodiment will now be described below with reference to the accompanying drawings. Like reference numerals refer to like elements throughout the specification.

A. Example of Offline Shopping

A goods buying technique according to an exemplary embodiment of the present invention will be first described in detail with reference to the accompanying drawings.

FIG. 1 shows an offline trading system according to an exemplary embodiment of the present invention. The term "offline trading system" as used herein may refer to a system supporting the overall procedure for selling and buying goods in an offline store.

Referring to FIG. 1, the offline trading system includes recording media 110, a buyer terminal 120, payment terminals 130, a merchant server 140, and a relay server 150.

The recording media 110 may display or store information (hereinafter referred to as 'goods purchase information') about specific goods being sold in an offline store. For example, the recording media 110 may display the goods purchase information in the form of an image, or store the goods purchase information in the form of an electrical signal. The recording media 110 may provide the goods purchase information displayed thereon or stored therein, to the buyer terminal 120.

A typical example of the image form is a barcode, and may be at least one of one-dimensional, two-dimensional and three-dimensional barcodes. In this case, the barcode may be attached to its associated goods or packing paper wrapping up the goods. However, the barcode may be attached to a display stand or the like independently of the relevant goods. Although it may be general that one barcode is provided for one goods, different barcodes may be provided for different purchase quantities of the same goods. Goods purchase information provided by each barcode may include information about the purchase quantity of the relevant goods, making it possible for a buyer to more easily collect goods purchase information corresponding to his or her desired purchase quantity.

As another example where goods purchase information is recorded in the form of an electrical signal, the recording media 110 may provide goods purchase information in accordance with a previously agreed communication protocol in response to a request from the buyer terminal 120. The recording media 110 may broadcast its goods purchase information in accordance with a predetermined communication protocol without any request from the buyer terminal 120. In this case, the buyer terminal 120 should be able to selectively collect only the goods purchase information broadcasted by the recording media 110 corresponding to the goods that its user (or buyer) has bought.

The goods purchase information recorded in the recording media 110 may be changed periodically or aperiodically by a seller. To this end, it is preferable for the recording media 110 to record goods purchase information in the form of an electrical signal. In this case, the goods purchase information recorded in the recording media 110 may be more easily updated by a server (e.g., the merchant server 140) that collectively supports the trading within the offline store. This feature may be usefully applied for sudden events where specific goods are sold at lower price.

A structure for updating the goods purchase information recorded in the recording media 110 is not shown in FIG. 1. However, although not shown in FIG. 1, the offline trading system may be built to update the goods purchase information recorded in the recording media 110 using a server capable of central control.

The goods purchase information provided by the recording media 110 should include at least goods identification information for recognizing or identifying relevant goods. In addition, the goods purchase information may include purchase quantity information, price information and event information of the goods.

If the goods purchase information includes only the goods identification information, then the purchase quantity information, the price information and the event information may be set in the buyer terminal 120 by the buyer or the seller (e.g., an employee who sells the relevant goods in the offline store). In other words, the purchase quantity information may be manipulated by the buyer or the seller on the buyer terminal 120. The purchase quantity information has a comprehensive meaning of the information for identifying the sale unit of the goods such as the number of purchases of the goods and purchase weight of the goods.

The buyer terminal 120 collects information about at least one goods its user (or the buyer) will buy, among the goods being sold in the offline store. In other words, the buyer terminal 120 receives goods purchase information from the recording media 110 which are provided in association with (or provided to correspond to) the goods the buyer wants to buy. The goods purchase information may be provided in various different ways according to the types of the goods purchase information recorded in the recording media 110.

For example, in the case where goods purchase information is displayed on the recording media 110 in the form of an image, the buyer terminal 120 may collect the goods purchase information corresponding to the goods by capturing the image using the camera mounted therein. In this case, barcodes such as QR codes may be a typical example of the image representing the goods purchase information.

Meanwhile, in the case where goods purchase information is recorded in the recording media 110 in the form of an electrical signal, the buyer terminal 120 may collect the goods purchase information corresponding to the goods based on a previously agreed communication protocol. In this case, short-range wireless communication such as NFC may be a typical communication protocol. In the case where goods purchase information is provided in accordance with the previously agreed communication protocol, the buyer terminal 120 may provide information about the purchase quantity for the goods the buyer wants to buy, to the recording media 110, if necessary. This is needed to collect more accurate goods purchase information from the recording media 110.

If the buyer terminal 120 may support both of the above two recording schemes, recording media 110 supporting only any one of the two recording schemes may coexist in the offline store depending on convenience of the seller.

The price information of the goods is an essential element for sale, but not necessarily included in the goods purchase information collected by the buyer terminal 120. For example, the price information may be managed by a device for processing payment, e.g., the payment terminal 130. In this case, the payment terminal 130 may calculate the accurate payment amount during payment if they have the goods identification information and the purchase quantity information.

However, if the goods purchase information includes the price information, the buyer may conveniently check the amount of money expected to buy the goods during shopping.

Upon collecting goods purchase information for at least one goods the buyer will buy, the buyer terminal 120 generates shopping information based on the collected goods purchase information. If the collected goods purchase information includes information sufficient for payment on the bought goods, the collected goods purchase information and the shopping information may be the same. Otherwise, the buyer terminal 120 may generate shopping information by processing the collected goods purchase information based on the unique information it has.

For example, the shopping information may include goods identification information and purchase quantity information of each bought goods, acquired from the collected goods purchase information, or may be a purchase amount calculated based on the collected goods purchase information. The purchase amount may be calculated by additionally considering event information provided by the offline store. The event information may be stored independently of the goods purchase information collected by the buyer terminal 120.

However, unlike the aforesaid description, the buyer terminal 120 may regard collecting goods purchase information as generating shopping information. In other words, by replacing generating shopping information with collecting goods purchase information, the buyer terminal 120 may not perform a separate operation of generating shopping information.

The buyer terminal 120 provides the collected goods purchase information or the generated shopping information (hereinafter referred to as 'shopping information') to the payment terminal 130. The buyer terminal 120 may provide the shopping information to the payment terminal 130 using short-range wireless communication.

The buyer terminal 120 may have payment means embedded therein. In this case, the buyer pays an amount of money corresponding to the bought goods, using the buyer terminal 120. In other words, the buyer terminal 120 provides its information about payment means to the payment terminal 130 upon request from the buyer. However, if the information about payment means is already stored in the payment terminal 130 or the merchant server 140, the buyer terminal 120 provides information for authenticating the information about payment means to the payment terminal 130. The authentication information is buyer identification information, and may further include a pre-registered customer phone number or a name of the customer. For higher security, the authentication information may be arbitrarily set by the customer, or may be encrypted.

For example, the information about payment means, card information for credit transactions, may be information needed for credit transactions, such as a card number and a card's expiration date.

The buyer terminal 120 may provide the shopping information and the information about payment means directly to the merchant server 140 or the relay server 150, rather than to the payment terminal 130. When requesting the relay server 150 to process the payment, the buyer terminal 120 may preferably provide information about the offline store (e.g., affiliated store) to the relay server 150.

The buyer terminal 120 may update the already collected goods purchase information upon the request that the buyer has made on a user interface embedded therein. In other words, when the buyer requests deletion or change of goods purchase information collected in association with specific goods, the buyer terminal 120 deletes or changes the goods purchase information from or in the shopping information in response to the request, meaning cancellation of buying the goods, or buying goods based on the changed goods purchase information. For example, the buyer may request to set or change the quantity of the bought goods. In response to the buyer's request, the buyer terminal 120 sets or changes the purchase quantity information constituting the goods purchase information for the goods.

The purchase terminal 120 operating as described above may include both a terminal that the buyer carries with him or her personally, such as a smart phone, and terminals specialized for the relevant function and deployed in the offline store. When the buyer uses his or her own terminal, the buyer may preferably need to install an application for transaction in the offline store in advance. Generally, the application may be installed after being downloaded from a server corresponding to the offline store or a server providing specific applications. Besides, upon detecting the buyer's entering the offline store, the merchant server 140 may install the application in the buyer terminal 120 with the consent of the buyer.

The payment terminal 130 supports payment on the bought goods based on the shopping information and the information about payment means, provided from the buyer terminal 120. For example, the payment terminal 130 may include a Point-Of-Sale (POS) terminal installed in large discount stores and department stores.

The payment terminal 130 may receive the information about payment means from the merchant server 140 based on the buyer identification information provided from the buyer terminal 130, or may receive information read by a separately provided card reader as the information about payment means.

For example, when goods identification information and purchase quantity information are provided as the shopping information, the payment terminal 130 may calculate a payment amount based on the shopping information. However, when a purchase amount is provided as the shopping information, the payment terminal 130 may regard the purchase amount as a payment amount, or calculate a new payment amount by applying an event to the purchase amount. In other words, the purchase amount provided as the shopping information may be equal to the payment amount, or equal to an amount of money given before the pricing policy of the event is reflected.

The payment terminal 130 may receive the information about payment means required for payment processing from the buyer terminal 120 or the card reader, or may acquire the information about payment means from the pre-registered information about payment means of each customer. In other words, the payment terminal 130 may process a payment on the payment amount based on the information about payment means provided by the buyer terminal 120, or may process the payment on the payment amount based on the information about payment means read by the card reader. In addition, the payment terminal 130 may process a payment on the payment amount based on the information about payment means that is registered in advance in association with the buyer identification information. The information about payment means has the same meaning as that defined in the description of the buyer terminal 120.

As the payment procedure performed by the payment terminal 130 is already known, a detailed description thereof will be omitted. However, there may be a procedure that is omitted or additionally required depending on the devices provided for payment processing.

For example, when the payment is processed by the payment terminal 130, a procedure for sending a payment request of the payment terminal 130 to the relay server 150 via the merchant server 140 will be added. However, if the merchant server 140 does not exist, a procedure for sending a payment request of the payment terminal 130 to the relay server 150 will be added.

When the payment is processed by the merchant server 140, a procedure is required in which the merchant server 140 directly requests the relay server 150 to process the payment. However, when a payment request from the buyer terminal 120 is directly sent to the relay server 150, no additional procedure is required to send the payment request.

The merchant server 140 may be a server that is responsible for a plurality of payment terminals #1 to #n 130-1, 130-2, and 130-*n* (e.g., a plurality of POS terminals) installed in large discount stores and department stores. Therefore, the merchant server 140 may be considered a structure that is necessarily required in an exemplary embodiment of the present invention.

The relay server 150 performs the overall payment processing on the payment amount in response to a payment request from at least one of the buyer terminal 120, the payment terminal 130 and the merchant server 140. For example, the relay server 150 may be realized with a Value Added Network (VAN) server. In this case, upon receiving a payment request from at least one of the buyer terminal 120, the payment terminal 130 and the merchant server 140, the relay server 150 generates a payment request message to agree with a specialized format of each credit card company based on the payment request information, and sends it to the credit card company server. In response, the relay server 150 receives authorization results from the credit card company server and transmits the results to at least one of the buyer terminal 120, the payment terminal 130 and the merchant server 140.

For example, upon receiving event information of the affiliated store in addition to the shopping information and the information about payment means from the buyer terminal 120, the relay server 150 checks the validity of the event information by way of the merchant server 140. If the event information is valid, the relay server 150 calculates a payment amount by reflecting the pricing policy associated with the event information. The relay server 150 sends a payment authorization request for the calculated payment amount to the credit card company server. The event information may include discount coupons for individual goods, discount coupons for the total amount, and membership card information.

In the foregoing description, it is assumed that the payment processing is achieved by the payment terminal 130. However, the payment processing may be performed by various other combinations. For example, not only a combination excepting the merchant server 140, but also a combination excepting the payment terminal 130 is possible. Moreover, excepting both the payment terminal 130 and the merchant server 140, the buyer terminal 120 and the relay server 150 may directly perform payment processing.

In an exemplary embodiment of the present invention, at least one of the payment terminal 130, the merchant server 140 and the relay server 150 that directly receive a payment request from the buyer terminal 120 will be referred to as a 'payment processing device' for convenience purpose only.

Figure 2:
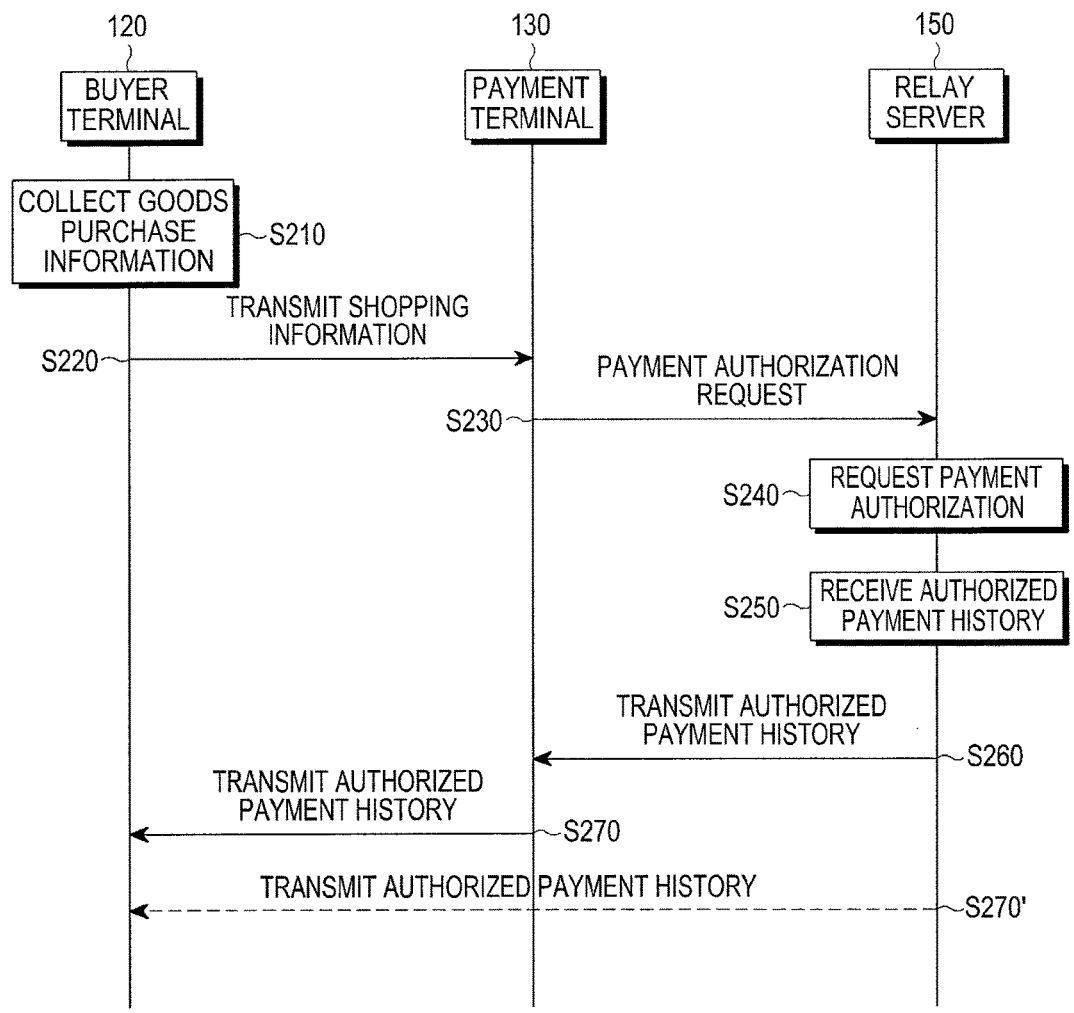
FIG. 2 shows a procedure for processing offline trading according to an exemplary embodiment of the present invention.

FIG. 2 shows a procedure for processing offline trading according to an exemplary embodiment of the present invention. In other words, FIG. 2 shows an example where the buyer terminal 120 processes a payment on a purchase amount through the payment terminal 130. Therefore, it can be understood that in the procedure shown in FIG. 2, the merchant server 140 in the configuration of FIG. 1 is excluded.

Referring to FIG. 2, in step S210, the buyer terminal 120 collects goods purchase information for at least one desired goods among the goods being sold in the offline store. For example, the buyer terminal 120 reads barcodes on recording media provided for bought goods, and collects goods purchase information acquired by the read of the barcodes. Although the barcodes are preferably attached to goods or packing thereof, the barcodes may be attached to a display stand. The same may be applied to all exemplary embodiments of the present invention.

The buyer terminal 120 generates shopping information based on the collected goods purchase information. Because the goods purchase information collected for generation of the shopping information has been defined above in detail, a detailed description thereof will be omitted.

In step S220, the buyer terminal 120 transmits the generated shopping information to the payment terminal 130. The buyer terminal 120 may use short-range wireless communication such as Bluetooth communication and NFC communication when transmitting the shopping information to the payment terminal 130.

Preferably, generation of the shopping information and transmission of the generated shopping information may be performed in a payment mode for payment processing. The buyer terminal 120 may include a specific application for collecting goods purchase information and transmitting shopping information generated based on the collected goods purchase information.

In step S230, upon receiving the shopping information from the buyer terminal 120, the payment terminal 130 sends a payment authorization request for a purchase amount to the relay server 150 based on the received shopping information. The payment terminal 130 may request payment authorization based on information about payment means transmitted by the buyer terminal 120, or information about payment means read by the card reader. In this case, the information about payment means may be provided from the buyer terminal 120 along with the shopping information.

However, if the information about payment means is not included in the shopping information, an additional procedure is required in which the payment terminal 130 acquires the information about payment means that is registered in advance in association with the buyer, from a merchant server or the relay server 150. This procedure is not shown in FIG. 2.

However, in order to acquire the information about payment means from the merchant server or the relay server 150, additional information for identifying a buyer is required. Therefore, the shopping information should include information for identifying a buyer instead of not including the information about payment means. The information for identifying a buyer may be a buyer's phone number, a previously set authentication number, or the like.

It is assumed in FIG. 2 that the payment terminal 130 directly requests payment authorization from the relay server 150. However, if there is a merchant server, the payment terminal 130 may request payment authorization from the relay server 150 via the merchant server.

In step S240, upon receiving the payment authorization request from the payment terminal 130, the relay server 150 forwards the payment authorization request for a payment-requested purchase amount to a relevant credit card company server (not shown). In step S250, the relay server 150 receives an authorized payment history from the credit card company server in response to the payment authorization request.

In step S260, the relay server 150 sends the received authorized payment history to the payment terminal 130. The payment terminal 130 outputs the authorized payment history transmitted from the relay server 150.

In steps S270 and S270', the buyer terminal 120 may receive the authorized payment history that is transmitted by the relay server 150 or the payment terminal 130 in the form of a message.

For example, the relay server 150 may transmit the authorized payment history to the buyer terminal 120 over a public communications network. The payment terminal 130 may forward the authorized payment history to the buyer terminal 120 using a short-range wireless communication technique such as NFC.

Figure 3:
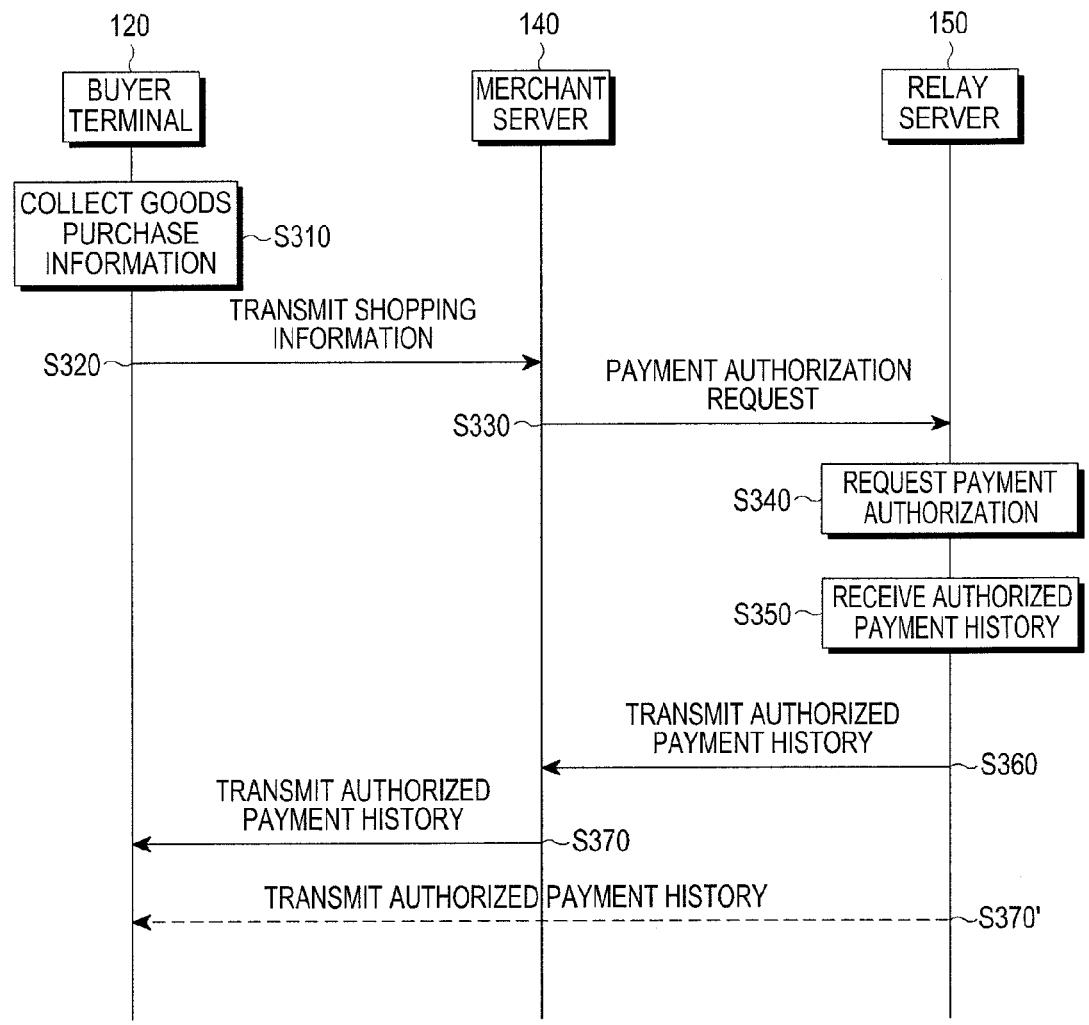
FIG. 3 shows a procedure for processing offline trading according to another exemplary embodiment of the present invention.

FIG. 3 shows a procedure for processing offline trading according to another exemplary embodiment of the present invention. In other words, FIG. 3 shows an example where the buyer terminal 120 directly requests a payment on a purchase amount from the merchant server 140. Therefore, it can be understood that in the procedure shown in FIG. 3, the payment terminal 130 in the configuration of FIG. 1 is excluded.

As a result, the procedure of FIG. 3 is different from the procedure of FIG. 2 only in that the merchant server 140 serves as the payment terminal 130. In other words, the merchant server 140 is involved in steps S330, S360 and S370 in FIG. 3, which correspond to steps S230, S260 and S270 in which the payment terminal 130 is involved in FIG. 2.

Figure 4:
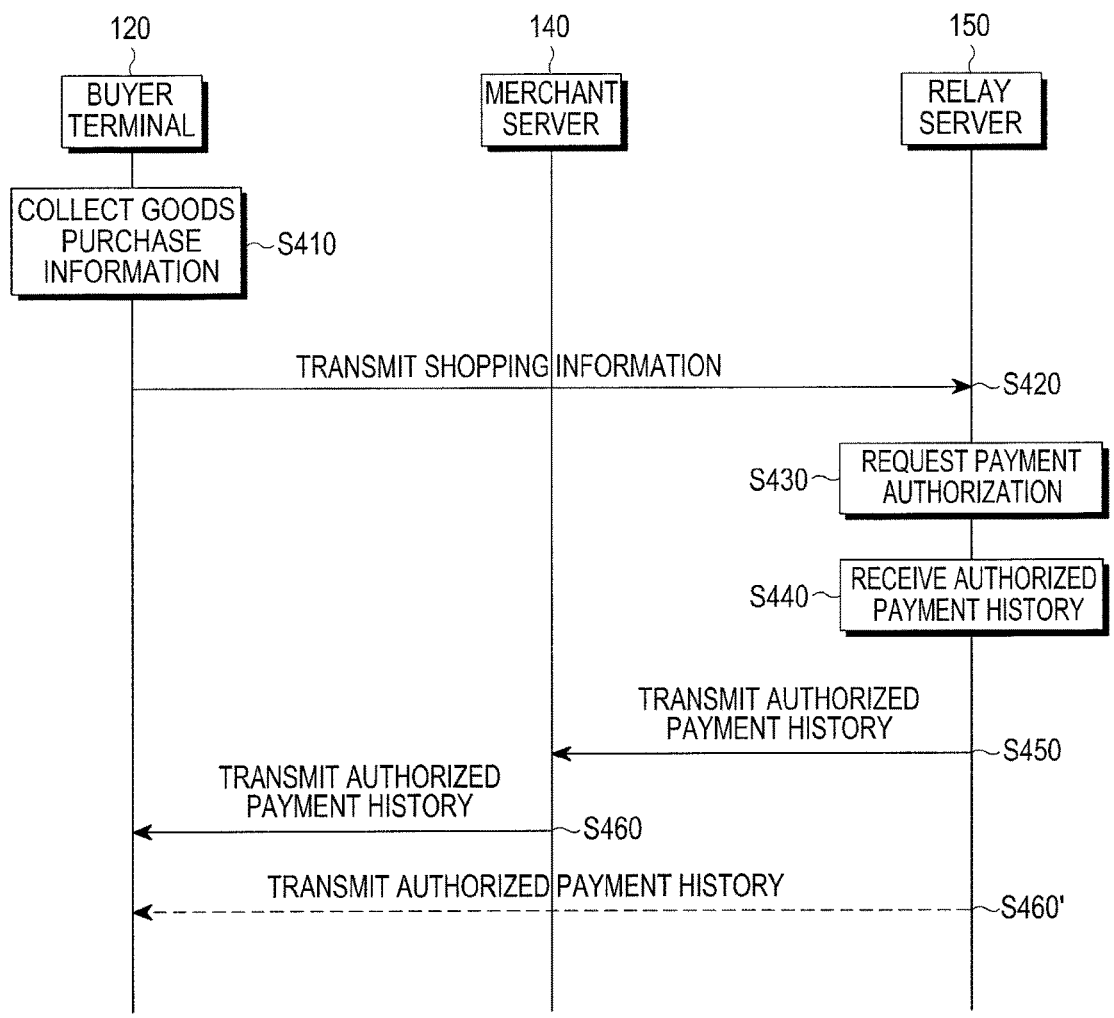
FIG. 4 shows a procedure for processing offline trading according to further another exemplary embodiment of the present invention.

FIG. 4 shows a procedure for processing offline trading according to further another exemplary embodiment of the present invention. In other words, FIG. 4 shows an example where the buyer terminal 120 directly requests a payment on a purchase amount from the relay server 150. Therefore, it can be understood that in the procedure shown in FIG. 4, the payment terminal 130 and the merchant server 140 in the configuration of FIG. 1 are excluded. However, it is assumed that the payment terminal 130 or the merchant server 140 performs only an operation of receiving an authorized payment history from the relay server 150 and outputting the received authorized payment history.

Figure 5:
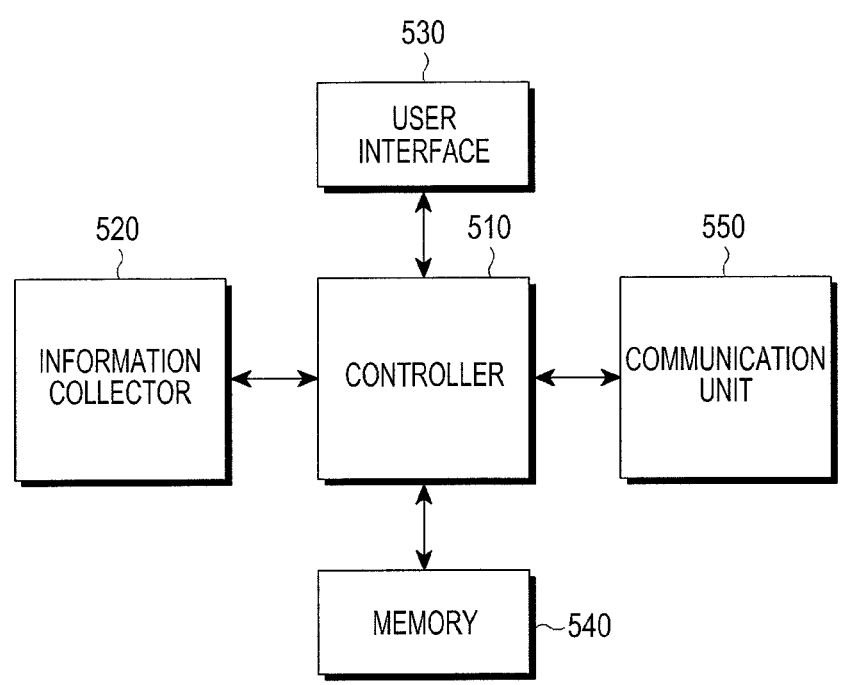
FIG. 5 shows an exemplary structure of a buyer terminal 120 according to an exemplary embodiment of the present invention.

FIG. 5 shows an exemplary structure of a buyer terminal 120 according to an exemplary embodiment of the present invention. As shown in FIG. 5, the buyer terminal 120 includes a controller 510, an information collector 520, a user interface 530, a memory 540, and a communication unit 550.

Referring to FIG. 5, the controller 510 controls the overall control operation of collecting goods purchase information for offline shopping and paying an amount of money corresponding to the bought goods based on the collected goods purchase information. For example, the controller 510 may control the collection of goods purchase information and the payment procedure based on the collected goods purchase information, upon the request that the buyer has made on the user interface 530.

The information collector 520 collects goods purchase information for bought goods from recording media corresponding to the bought goods, under control of the controller 510. Therefore, a technique by which the information collector 520 collects goods purchase information is dependent on a technique by which the recording media provide goods purchase information.

For example, in the case where the recording media provide goods purchase information in the form of barcode images or the like, the information collector 520 acquires goods purchase information from the barcode images provided by the recording media, using a camera (not shown). In this case, the information collector 520 or the controller 510 may take advantage of a commercial application for acquiring goods purchase information from images received by the camera or the like. Generally, the commercial application resides in the memory 540 and runs at the request of the controller 510. The barcode images or the like may be attached to goods or packing thereof, or may be attached to a display stand separately.

As another example, in the case where the recording media provide goods purchase information based on a short-range wireless communication technique, the information collector 520 includes a communication module that collects information based on the short-range wireless communication technique used by the recording media. In this case, the information collector 520 may request goods purchase information from the recording media upon request of the controller 510, and collect desired goods purchase information from the recording media in response to the request. Otherwise, in the case where the recording media support a technique of broadcasting their own goods purchase information, the information collector 520 may collect desired goods purchase information without a separate request. However, when collecting broadcast-based goods purchase information, the information collector 520 needs a technique capable of selectively collecting the goods purchase information broadcasted by the recording media.

If the information collector 520 can support various information collection techniques, the information collector 520 may selectively use the optimal information collection technique under control of the controller 510 or in response to a request from the recording media.

The information collector 520 may manage the collected goods purchase information in the memory 540 by means of the controller 510, or directly provide the collected goods purchase information to the memory 540 for its management.

Upon receiving a shopping information generation request from the buyer through the user interface 530, the controller 510 generates shopping information based on the collected goods purchase information corresponding to at least one goods. For example, the shopping information generation request may be a shopping complete command that is received from the buyer through the user interface 530. The goods purchase information may be provided after being collected by the information collector 520, or may be provided from the memory 540.

Upon receiving a payment request through the user interface 530, the controller 510 commands the communication unit 550 to provide the generated shopping information to a payment processing device. The payment processing device, as defined above, refers to at least one of a payment terminal, a merchant server and a relay server that will process a payment upon request from the buyer terminal.

For example, the communication unit 550 may provide the shopping information to the payment processing device using short-range wireless communication such as Bluetooth communication and NFC communication. The communication unit 550 may also apply other Internet Protocol (IP)-based wired/wireless communication schemes.

For a payment procedure performed by the controller 510, a commercial application for payment processing may be installed in the memory 540, and the installed commercial application may run upon request of the controller 510.

The user interface 530 may be realized by means of various input/output devices, and may provide command signals corresponding to buyer's manipulations to the controller 510 or may display the operating status of the buyer terminal under control of the controller 510.

Upon the buyer's request through the user interface 530, the controller 510 may calculate an expected payment amount based on the goods purchase information collected up to the present, and provide it to the buyer through the user interface 530.

The user interface 530 may request the buyer to input purchase quantity information representing the number of goods, weight thereof, etc. or correct the goods purchase information, and may provide the controller 510 with the information that the buyer inputs in response to the request. In this case, the controller 510 may update the goods purchase information stored in the memory 540 based on the information provided from the user interface 530. The updated goods purchase information may be output on the user interface 530 under control of the controller 510.

The user interface 530 may provide the information about payment means input by the buyer to the controller 510 or may display the ongoing payment situations under control of the controller 510.

Otherwise, the information about payment means may be registered in the memory 540 in advance. In this case, the information about payment means registered in the memory 540 should be provided to the controller 510 at the payment request of the buyer. As the information about payment means is privacy information, this information may preferably need to be protected by encryption or the like. For example, the information about payment means may be stored in a separate Universal Subscriber Identity Module (USIM) chip with strong security features. The information about payment means may be at least one of card information for credit transactions, buyer identification information, etc.

The controller 510 may instruct the communication unit 550 to forward the information about payment means to the payment processing device along with the shopping information. The communication unit 550 provides the shopping information and the information about payment means to the payment processing device based on a predetermined communication scheme under control of the controller 510. Preferably, this communication scheme may be performed based on the network used during credit payment processing.

If information about an event going on in the offline store is stored in the memory 540, the controller 510 may reflect the event information during generation of the shopping information, or may provide the event information to the payment processing device for payment request.

Figure 6:
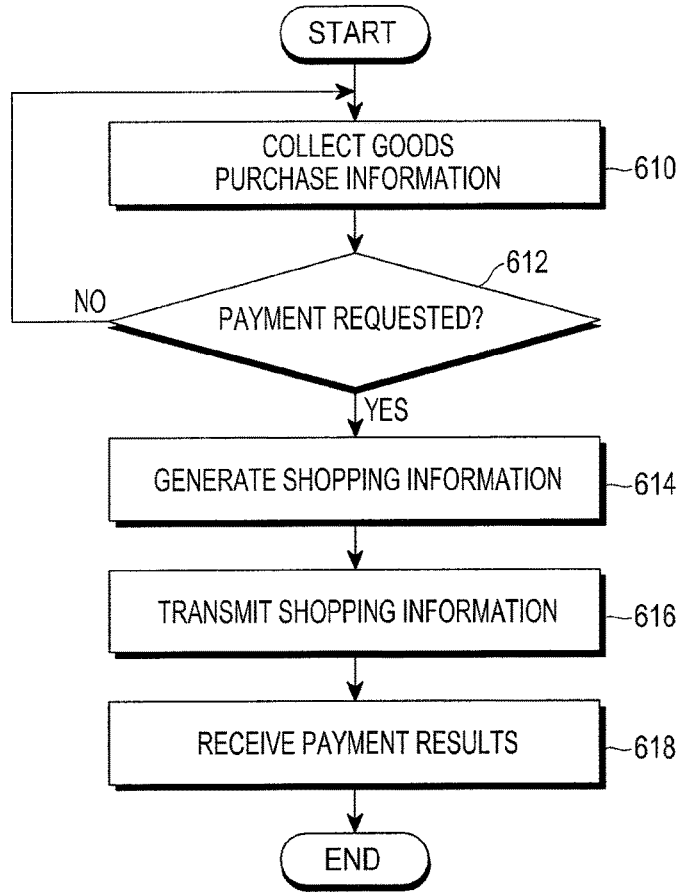
FIG. 6 shows a control flow performed by a buyer terminal according to an exemplary embodiment of the present invention.

FIG. 6 shows a control flow performed by a buyer terminal according to an exemplary embodiment of the present invention.

Referring to FIG. 6, the buyer terminal collects goods purchase information in step 610. In other words, the buyer terminal collects goods purchase information for at least one desired goods among the goods being sold in the offline store. For example, the goods purchase information may be collected based on barcode reading, short-range wireless communication, etc.

In step 612, the buyer terminal monitors whether a shopping complete indication such as a payment request is received from the buyer while collecting goods purchase information. The buyer terminal will continuously collect goods purchase information corresponding to bought goods at the buyer's request until it receives a shopping complete indication.

Upon receiving a shopping complete indication such as a payment request from the buyer, the buyer terminal generates shopping information based on the goods purchase information collected up to the present in step 614. For example, the shopping information may be generated by additionally considering the information about payment means, the quantity information and the event information in addition to the goods information and the price information. As various examples of generating the shopping information have been described in detail with reference to FIGS. 2 to 4, a description thereof will be omitted.

Although not specifically shown in the drawing, the buyer terminal may change or delete the collected goods purchase information at the buyer's request during generating of the shopping information. In other words, in step S614, the buyer terminal may perform an operation of updating the collected goods purchase information at the buyer's request. For example, the buyer may delete the goods purchase information collected in association with specific goods, or may change the quantity information of specific goods.

If the goods purchase information is changed by the buyer, the buyer terminal may preferably generate shopping information based on the changed goods purchase information.

In step 616, the buyer terminal transmits the generated shopping information to the payment processing device. In other words, the buyer terminal transmits the generated shopping information to at least one of a payment terminal, a merchant server and a relay server, which is designated as a payment processing device. The buyer terminal may transmit the shopping information using short-range wireless communication such as Bluetooth communication and NFC communication.

When the shopping information is transmitted to the relay server, the buyer terminal may preferably provide the shopping information along with merchant information required for payment processing.

After transmitting the shopping information, the buyer terminal may report the ongoing payment situations provided from the payment processing device to the buyer in step 618. For example, the buyer terminal may receive the payment results from the payment processing device and display the received payment results on its screen so that the buyer may check the payment results.

Figure 7:
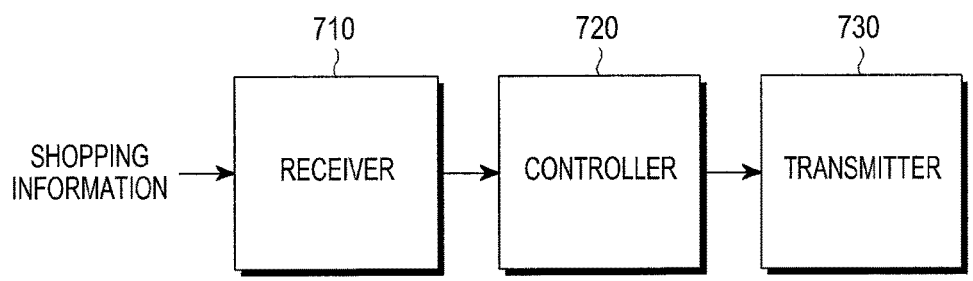
FIG. 7 shows an exemplary structure of a payment processing device according to an exemplary embodiment of the present invention.

FIG. 7 shows an exemplary structure of a payment processing device according to an exemplary embodiment of the present invention. The payment processing device, at least one of the payment terminal 130, the merchant server 140 and the relay server 150, includes a receiver 710, a controller 720 and a transmitter 730.

Referring to FIG. 7, the receiver 710 receives shopping information from the buyer terminal. Short-range wireless communication may be used to receive the shopping information from the buyer terminal.

The shopping information includes goods information and price information for at least one bought goods, and optional information about payment means. If the relay server 150 serves as a payment processing device, the shopping information may include merchant information corresponding to an offline store where the goods are sold.

The receiver 710 may additionally receive information about an event going on in the offline store or the affiliated store along with the shopping information, or independently of the shopping information.

The receiver 710 provides information such as the received shopping information to the controller 720. The controller 720 controls the overall operation of processing a payment based on the shopping information provided from the receiver 710.

If event information is received in addition to the shopping information, or if event information is input from an internal memory or by an operator, the controller 720 reflects the event information during payment processing. For example, the controller 720 determines a purchase amount based on the shopping information, and calculates a payment amount for processing a final payment by reflecting a pricing policy associated with the event information in the determined purchase amount. However, if there is no event information, the purchase amount and the payment amount may be the same.

Assuming that the relay server serves as a payment processing device, when event information is received from the buyer terminal, the relay server may preferably check the validity of the event information. In other words, the relay server provides the event information received from the buyer terminal to the merchant server, and reflects the event information in calculating a payment amount if the merchant server determines that the event information is valid. This is to prevent payment errors from occurring due to the event information.

After completing the calculation of a payment amount, the controller 720 performs a payment procedure on the calculated payment amount based on the information about payment means. The controller 720 may receive the information about payment means by means of the shopping information. However, if no information about payment means is provided by means of the shopping information, the controller 720 receives information about payment means by other procedures.

For example, the controller 720 may receive information about payment means read by a card reader, or may use information about payment means registered in its internal memory. However, in order to use the information about payment means registered in the internal memory, an authentication procedure is required. Therefore, the buyer terminal needs to provide the payment processing device with information for determining whether it is allowed to use the registered information about payment means. The available information about payment means may include a buyer's phone number, an encryption key registered by the buyer, etc.

Although not shown, the information about payment means may be received through a user interface, or may be provided from an external device through the receiver 710.

Upon acquiring the information about payment means, the controller 720 processes a payment on the calculated payment amount based on the acquired information about payment means. In other words, the controller 720 provides the payment amount, the merchant information, and the information about payment means to the transmitter 730, and instructs to process a payment based on the provided information.

The transmitter 730 performs the usual payment procedure on the payment amount based on the information about payment means under control of the controller 720.

Upon receiving a report on an authorized payment history from a financial server, the receiver 710 provides it to the controller 720. Upon receiving the authorized payment history, the controller 720 controls the transmitter 730 to forward the authorized payment history to the buyer terminal, the payment terminal or the like.

Figure 8:
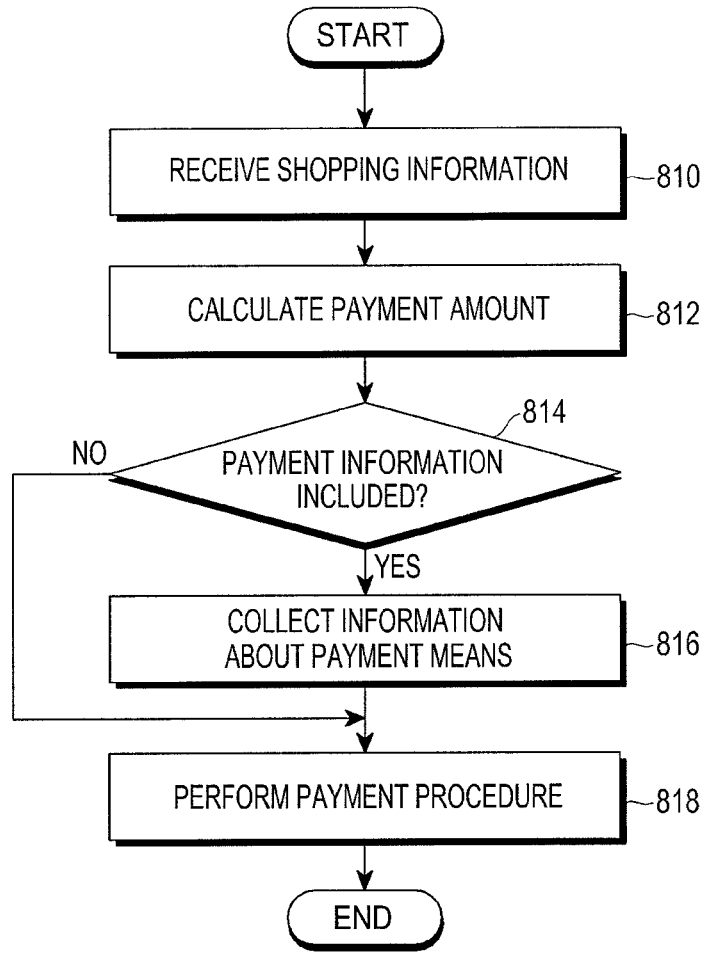
FIG. 8 shows a control flow performed by a payment processing device according to an exemplary embodiment of the present invention.

FIG. 8 shows a control flow performed by a payment processing device according to an exemplary embodiment of the present invention. Part of this operation may vary depending on which of a payment terminal, a merchant server and a relay server will serve as the payment processing device. However, FIG. 8 shows only an operation that is performed in common regardless of the type of the payment processing device. Therefore, an operation that can be differentiated according to the type of the payment processing device will be additionally described below.

Referring to FIG. 8, the payment processing device receives shopping information from a buyer terminal using short-range wireless communication in step 810. The shopping information includes goods information and price information of each bought goods, and may additionally include information about payment means. The shopping information may include merchant information corresponding to the offline store where the goods are sold. Generally, however, the shopping information may include the merchant information only when the relay server serves as the payment processing device.

The payment processing device may additionally receive information related to an event going on in the offline store or the affiliated store from the buyer terminal in step 810.

In step 812, the payment processing device calculates a payment amount based on the received shopping information. When there is event information, the payment processing device should calculate the payment amount considering the event information. For example, the payment processing device calculates a payment amount by determining a purchase amount based on the shopping information and reflecting the pricing policy associated with the event information in the determined purchase amount. However, if there is no event information, the purchase amount and the payment amount may be the same.

In the case where the relay server performs the operation of FIG. 8, the relay server may preferably perform a procedure for checking the validity of the acquired event information. For example, the relay server may check the validity of the event information received from the buyer terminal with help of the merchant server.

After completing the calculation of the payment amount, the payment processing device determines in step 814 whether the shopping information includes information about payment means. If the shopping information includes no information about payment means, the payment processing device collects information about payment means in step 816.

For example, the payment processing device may receive information about payment means read by its card reader, or may use information about payment means registered in its internal memory. However, in order to use the information about payment means registered in the internal memory, the payment processing device may preferably perform an authentication procedure. To this end, the payment processing device may require a phone number, an authentication number and the like from the buyer terminal.

The payment processing device may receive the information about payment means through its user interface or from an external device.

Upon acquiring the information about payment means, the payment processing device performs a payment procedure on the calculated payment amount in step 818. The payment processing device may perform the payment procedure on the payment amount based on the acquired information about payment means.

B. Example of Shipping or Delivery

A goods delivery technique according to an exemplary embodiment of the present invention will now be described in detail with reference to the accompanying drawings.

Figure 9:
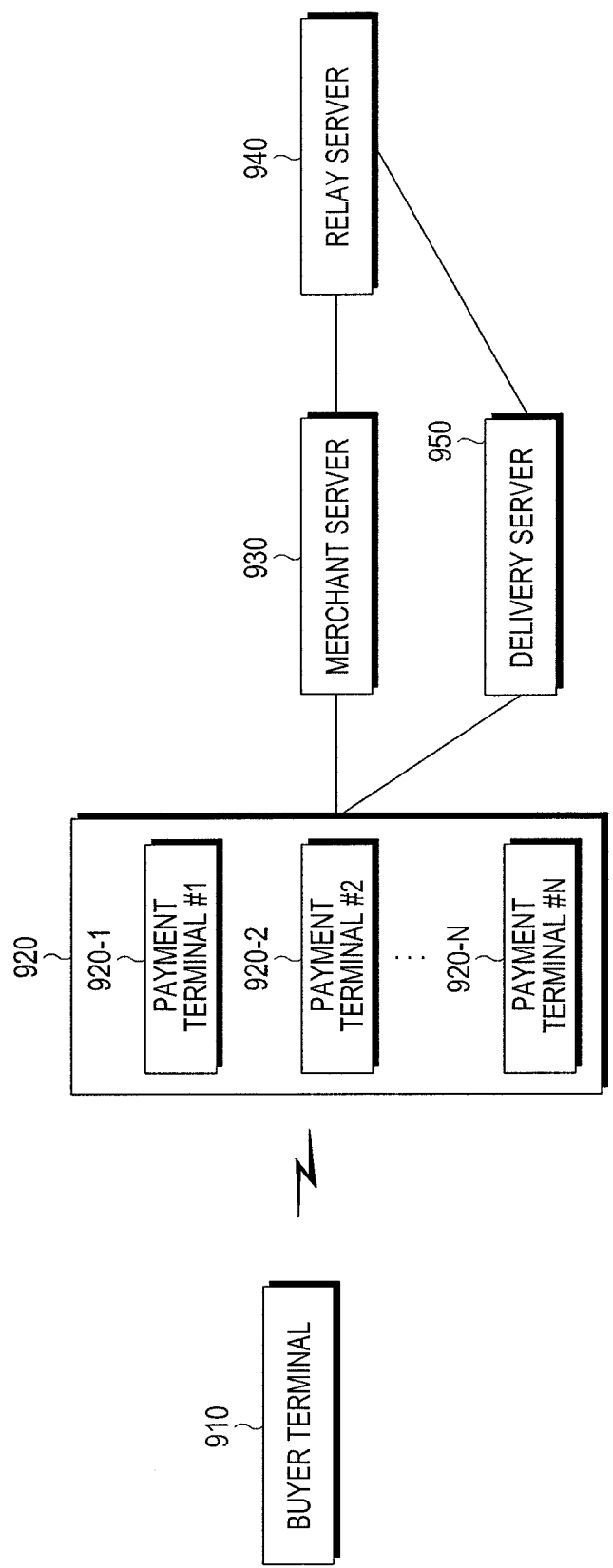
FIG. 9 shows an offline trading system for supporting a delivery service according to an exemplary embodiment of the present invention.

FIG. 9 shows an offline trading system for supporting a delivery service according to an exemplary embodiment of the present invention. The term "offline trading system" as used herein may refer to a system supporting the overall procedure for delivering goods sold in an offline store.

Referring to FIG. 9, the offline trading system includes a buyer terminal 910, payment terminals 920, a merchant server 930, a relay server 940, and a delivery server 950.

The buyer terminal 910 may provide delivery information for delivery of bought goods to at least one of the payment terminal 920, the merchant server 930 and the relay server 940. For example, the delivery information may include not only information about bought goods but also information about the destination to which bought goods are to be delivered, and/or buyer identification information.

For example, the destination information may be place information preset in the offline store, or an address of the buyer who bought the goods. Preferably, only a customer's phone number (e.g., home phone number or cell phone number) may be used as the buyer identification information. However, a customer name and the like may be additionally used.

When the buyer identification information is used as the delivery information, a database needs to be prepared separately that registers and manages destination information corresponding to the buyer identification information in advance.

For the delivery, the above two methods may be applied together. In other words, when no separate destination information for delivery is provided from the buyer, the delivery may be set based on the destination information that is registered in advance in association with the buyer identification information, and when separate destination information for delivery is provided from the buyer, the delivery may be set based on the destination information provided by the buyer.

The buyer terminal 910 may receive a notification message indicating completion of the delivery from the delivery server 950 or other devices in response to its delivery request, and inform the consumer or the buyer of the completion of the delivery upon receiving the notification message.

At least one of the payment terminal 920, the merchant server 930 and the relay server 940 receives the delivery information provided from the buyer terminal 910. For convenience of description, any one of the payment terminal 920, the merchant server 930 and the relay server 940, which has received the delivery information, will be referred to as a 'delivery request device'

The delivery information may be provided from the buyer terminal 910 to the delivery request device using short-range wireless communication. The term 'delivery information' as used herein may refer to information required to deliver bought goods at the consumer's request. Preferably, the delivery information may be provided after a payment on the bought goods is completed. Therefore, when the payment processing device and the delivery request device are not the same even though the delivery has been requested by the buyer, the payment processing device should be able to inform the delivery request device of its success/failure in payment processing.

The delivery information includes at least one of information about the destination to which bought goods are to be delivered and buyer identification information, and information about the bought goods. Having the delivery information include the information about bought goods is to make it possible for correct goods to be delivered during delivery. For example, the destination information may be an address of a destination or a receiving place to which bought goods are to be delivered.

Just in case that the delivery information includes buyer identification information, the delivery request device needs to prepare a database that manages destination information for each customer in advance. Therefore, upon receiving the buyer identification information, the delivery request device may acquire the destination information that is managed in the database in association with the customer recognized by the buyer identification information.

Upon acquiring information about goods to be delivered and their destination information, the delivery request device requests delivery of the bought goods based on the acquired information. The delivery request device requests the delivery from the delivery server 950. During delivery request, the delivery request device provides the information about goods to be delivered and their destination information to the delivery server 950. In this case, a different delivery request procedure needs to be applied depending on which of the payment terminal 920, the merchant server 930 and the relay server 940 is the delivery request device. For example, in the case where the delivery request device is the payment terminal 920 or the relay server 940, a payment request by the payment terminal 920 or the relay server 940 is sent to the delivery server 950 through the merchant server 930. However, in the case where the delivery request device is the merchant server 930, the delivery request device may directly request the delivery from the delivery server 950 without other devices.

Considering the case where buyer identification information is provided as destination information during delivery request by the delivery server 950, the delivery server 950 may include a database that manages destination information for each customer in advance.

Upon receiving a delivery request from the delivery request device, the delivery server 950 sets to deliver the bought goods checked by information about the bought goods to be delivered, to the destination acquired based on the destination information. This setting means that employees in charge of delivery are managed to be able to recognize the goods to deliver and the destination to which they will deliver the goods.

After setting the delivery in response to the delivery request, the delivery server 950 sends a notification message indicating the completion of its ready for the delivery to the buyer terminal 910. To this end, if necessary, the delivery server 950 needs to prepare a technique for managing a destination corresponding to the buyer terminal 910 for each customer and/or receiving associated destination information from the delivery request device.

The delivery server 950 that processes a delivery reception for the bought goods at the buyer's request may be realized in a fixed delivery server or a mobile delivery server. The delivery server 950 may directly receive a delivery request from the buyer terminal 910 without passing through the delivery request device. In this case, the delivery server 950 needs to determine whether a payment on the delivery-requested bought goods has been completed, with help of at least one of the payment terminal 920, the merchant server 930, and the relay server 940. The delivery server 950 may directly receive authorized-payment information from a financial server (not shown) as it has identification information of the buyer.

In the foregoing description, as the term 'delivery server 950' is used, the delivery server 950 may be construed as a fixed device. However, it is obvious that the delivery server 950 may be realized by a mobile terminal as long as it has hardware and software performances capable of handling delivery requests occurring in the affiliated store.

Figure 10:
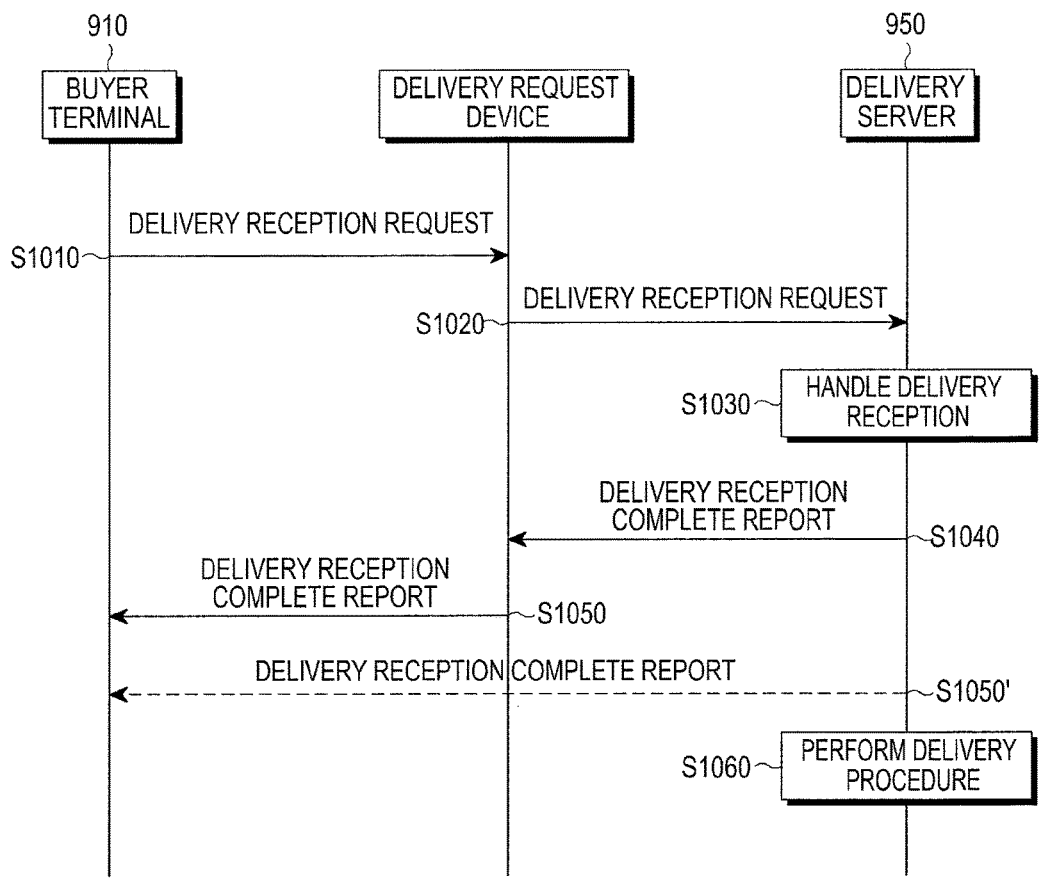
FIG. 10 shows a procedure for processing a delivery service in an offline trading system according to an exemplary embodiment of the present invention.

FIG. 10 shows a procedure for processing a delivery service in an offline trading system according to an exemplary embodiment of the present invention, in which a delivery request device may be any one of the payment terminal 920, the merchant server 930, and the relay server 940 shown in FIG. 9.

Referring to FIG. 10, the buyer terminal 910 transmits delivery information for requesting a delivery service for bought goods to the delivery request device in step S1010. The delivery information includes information about at least one goods bought by the buyer, and destination information for the delivery or buyer identification information. The destination information may be place information preset in the affiliated store, or an address of the buyer who bought the goods. Preferably, only a customer's phone number (e.g., home phone number or cell phone number) may be used as the buyer identification information. However, a customer name and the like may be additionally used.

When using the buyer identification information, the delivery request device or the delivery server 950 needs to separately have a database for registering and managing destination information corresponding to the buyer identification information in advance.

Upon request for delivery reception, the buyer terminal 910 provides the delivery information to the delivery request device using short-range wireless communication (e.g., Bluetooth communication, NFC communication, etc.). The buyer terminal 910 may transmit a phone number or a customer name corresponding thereto along with the delivery information.

Upon receiving the delivery information from the buyer terminal 910, the delivery request device requests delivery reception from the delivery server 950 based on the received delivery information in step S1020. If the received delivery information includes information sufficient for delivery reception, the delivery request device may use the received delivery information intact when requesting the delivery reception from the delivery server 950. Otherwise, the delivery request device processes the received delivery information and transfers the processed delivery information to the delivery server 950.

For example, if the delivery information includes buyer identification information, the delivery request device may provide the destination information being managed in association with the buyer identification information, to the delivery server 950. However, if destination information for each customer is managed by the delivery server 950, the delivery request device does not necessarily need to provide the destination information to the delivery server 950.

Preferably, the delivery reception request by the delivery request device may be made after the delivery request device completes a payment on the goods bought by the buyer. Therefore, the delivery request device needs to determine whether the payment processing device has authorized the payment, if the payment processing device and the delivery request device are not the same even though the delivery is requested by the buyer terminal 910. In this case, when requesting delivery reception from the delivery server 950, the delivery request device may transmit authorized-payment information to the delivery server 950 along with the delivery information.

Therefore, a payment processing procedure by the payment processing device may be performed between steps S1010 and S1020. For example, for the payment processing procedure, the payment procedure, which has been proposed before as an exemplary embodiment of the present invention, may be applied in the same way. To this end, the buyer terminal 910 may provide information (e.g., shopping information) needed for payment processing to the payment processing device in step S1010. If the payment processing device and the delivery request device are the same, the buyer terminal 910 may provide the shopping information and the delivery information to the same target (e.g., delivery request device or payment processing device).

In the case where the delivery request device is the relay server 940, the delivery reception request by the relay server 940 may be provided to the delivery server 950 through the merchant server 930 without being directly provided to the delivery server 950 in step S1020. In other words, upon request for delivery reception, if the buyer identification information is provided by the buyer terminal 910, the delivery reception request may preferably be provided to the delivery server 950 via the merchant server 930.

Upon receiving the request for delivery reception from the delivery request device, the delivery server 950 processes the delivery reception in step S1030. To this end, the delivery server 950 receives the information about bought goods, and the associated destination information or buyer identification information from the delivery request device.

When the buyer identification information is received from the delivery request device, the delivery server 950 should check the destination information it manages in association with the received buyer identification information, as the delivery server 950 requires the destination information for its delivery reception processing.

When the delivery server 950 cannot check the destination information of the buyer who requested the delivery, the delivery server 950 may inform the buyer terminal 910 of its fail in receiving the delivery request. However, if delivery reception has been normally completed, the delivery server 950 outputs delivery reception results. In other words, the delivery server 950 outputs, on paper or screen, information about delivery reception-succeed bought goods and information about the destination to which the bought goods are to be delivered.

For example, if the delivery server 950 is a fixed delivery server that is fixed at a specific location, the delivery server 950 outputs information about bought goods and the information about the destination to which the bought goods are to be delivered, on paper by a printer. Otherwise, if the delivery server 950 is a mobile delivery server that an employee may carry with him or her, or a fixed delivery server that can communicate with a portable terminal of the employee, the delivery server 950 may output the information about bought goods and the information about the destination to which the bought goods are to be delivered, on its screen.

Outputting the information about bought goods and the information about the destination to which the bought goods are to be delivered, is to allow the merchant staff to easily prepare for delivery of ordered goods.

After successfully completing the reception of the delivery service requested by the buyer, the delivery server 950 sends a delivery reception complete report to the delivery request device in step S1040. In addition, the delivery server 950 may directly report its completion of delivery reception to the buyer terminal 910 in step S1050'.

Upon receiving the delivery reception complete report from the delivery server 950, the delivery request device forwards the delivery reception complete report to the buyer terminal 910 in step S1050.

Although not shown in the drawing, the delivery server 950 determines whether delivery preparation for the bought goods has been completed by continuously monitoring the bought goods, a delivery request for which has been received. For example, a fixed delivery server 950 may determine whether the delivery preparation has been completed by checking whether a goods order number and a delivery preparation complete key are received. A mobile delivery server 950 may determine whether the delivery preparation has been completed by checking whether a delivery preparation complete key is received.

If the delivery preparation is completed, the delivery server 950 performs a delivery procedure based on the destination information in step S1060. For example, upon completion of the delivery preparation, the delivery server 950 outputs printed paper to be attached to, for example, a packing box of goods to be delivered. On the output paper may be printed the destination information and the information about bought goods. If the destination information is place information that is preset in the affiliated store, the delivery server 950 may output the buyer's phone number or the buyer's name together.

If the destination information is a customer address, the delivery server 950 may provide an estimated goods delivery time or the like to the buyer in the form of a text message.

Figure 11:
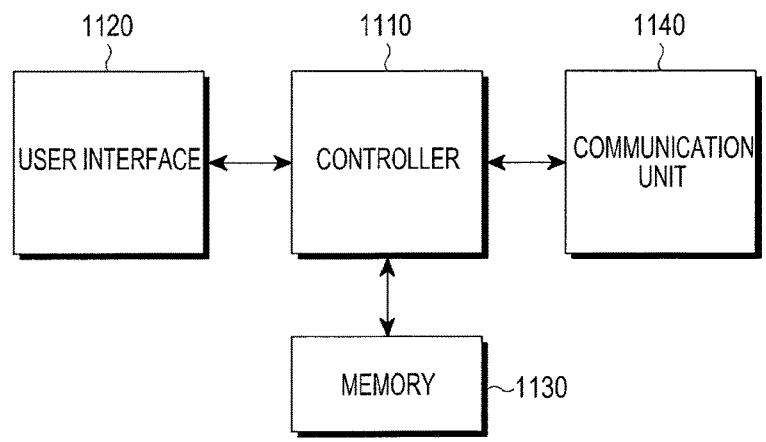
FIG. 11 shows an exemplary structure of a buyer terminal for a delivery service according to an exemplary embodiment of the present invention.

FIG. 11 shows an exemplary structure of a buyer terminal for a delivery service according to an exemplary embodiment of the present invention. The buyer terminal includes a controller 1110, a user interface 1120, a memory 1130, and a communication unit 1140.

Referring to FIG. 11, the user interface 1120 includes alphanumeric keys and various function keys as its input means, and includes Liquid Crystal Display (LCD) or the like as its output means. The user interface 1120 may be realized in a touch screen in which the input means and the output means are integrated. The user interface 1120 transfers key input signals corresponding to the keys input by manipulation of the buyer to the controller 1110, and/or displays various display data.

In particular, the user interface 1120 allows the buyer to input information needed to take advantage of the delivery service, and displays the current status of the requested delivery service under control of the controller 1110. For example, the information that the buyer inputs on the user interface 1120 for the delivery service may include destination address information, buyer identification information or the like, as delivery information. In addition, information about bought goods may be input through the user interface 1120. To this end, the user interface 1120 may additionally include image capturing means such as a camera.

The controller 1110 controls the overall operation of allowing the buyer to take advantage of the delivery server. In other words, the controller 1110 generates delivery information and transmits the generated delivery information to a delivery request device through the communication unit 1140, thereby requesting delivery reception. The delivery information includes information about bought goods, and destination information or buyer identification information needed to acquire the destination information.

To generate the delivery information, the controller 1110 collects information through the user interface 1120 or uses information stored in the memory 1130. To generate the delivery information, the controller 1110 may collect information through the communication unit 1140.

The memory 1130 stores various information needed by the controller 1110 to allow the buyer to take advantage of the delivery service. In particular, the memory 1130 may store an application for supporting the delivery service and/or general-purpose applications. In addition, the memory 1130 stores information about at least one payment means used for payment purpose, and customer identification information. The card information and the customer identification information may be stored in a separate USIM chip.

The communication unit 1140 may transmit and receive information based on various other communications in addition to the short-range wireless communication. In particular, the communication unit 1140 transmits the delivery information for delivery request to the delivery request device under control of the controller 1110. The communication unit 1140 receives a delivery reception complete report that is received in response to the delivery request, and reports its reception to the controller 1110.

Figure 12:
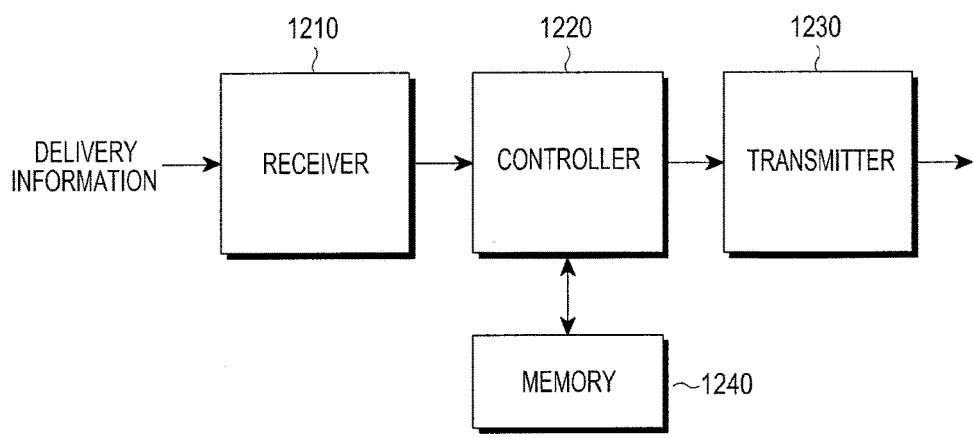
FIG. 12 shows an exemplary structure of a delivery request device supporting a delivery service according to an exemplary embodiment of the present invention.

FIG. 12 shows an exemplary structure of a delivery request device supporting a delivery service according to an exemplary embodiment of the present invention. The delivery request device includes a receiver 1210, a controller 1220, a transmitter 1230, and a memory 1240. In the case where the delivery request device is a payment terminal, although not shown in FIG. 12, the delivery request device may further include a card reader, an output unit and the like.

Referring to FIG. 12, the receiver 1210 receives delivery information transmitted for delivery reception, from a buyer terminal. The receiver 1210 transfers the delivery information received from the buyer terminal to the controller 1220. The delivery information includes information about bought goods to be delivered, and destination information for the delivery or buyer identification information.

The controller 1220 controls the overall operation of performing delivery reception in response to a delivery reception request received from the buyer terminal. To this end, upon receiving the delivery information from the receiver 1210, the controller 1220 sends a delivery reception request for the bought goods delivery-requested by the buyer to the delivery server based on the received delivery information.

The destination information constituting the delivery information may be place information that is preset in an affiliated store where the goods are sold, or address information of the buyer. The buyer identification information constituting the delivery information may be an identification number or a buyer name corresponding to the buyer terminal, or a login ID and a password of an application.

If a payment on the delivery reception-requested bought goods has been normally completed, the controller 1220 controls the transmitter 1230 to request delivery reception from the delivery server based on the received delivery information.

The transmitter 1230 transmits information (shopping information) about bought goods, and destination information or buyer identification information provided from the controller 1220, to the merchant server or the delivery server.

The memory 1240 stores a variety of information for processing reception of the delivery service in response to the request from the buyer terminal. In particular, the memory 1240 manages destination information in association with the buyer identification information provided as delivery information, and outputs destination information corresponding to specific buyer identification information at the request of the controller 1220.

Figure 13:
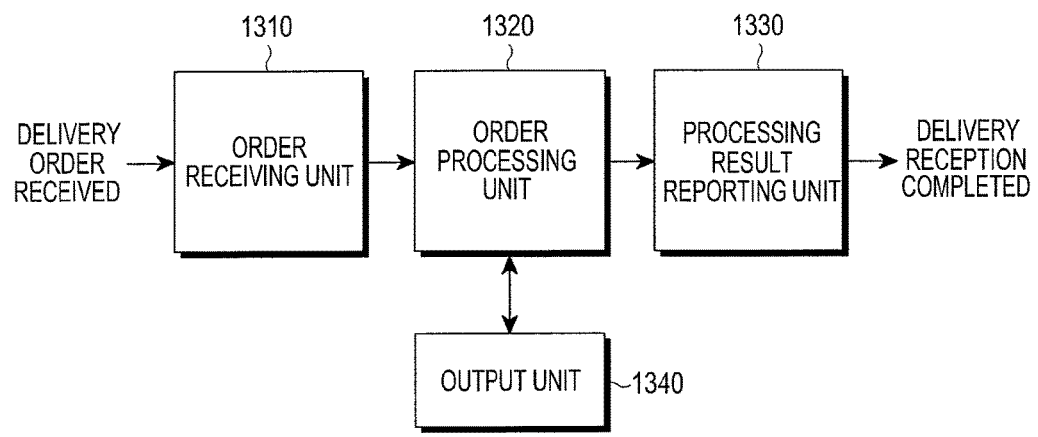
FIG. 13 shows an exemplary structure of a delivery server according to an exemplary embodiment of the present invention.

FIG. 13 shows an exemplary structure of a delivery server according to an exemplary embodiment of the present invention. The delivery server includes an order receiving unit 1310, an order processing unit 1320, an output unit 1340, and a processing result reporting unit 1330.

Referring to FIG. 13, the order receiving unit 1310 receives a delivery request by receiving shopping information (e.g., information about goods to be delivered) and destination information or buyer identification information from a delivery request device. The order receiving unit 1310 provides the shopping information and the destination information or buyer identification information received for reception of a delivery request, to the order processing unit 1320.

The order processing unit 1320 performs the overall operation of processing an order request (or delivery request) received from the delivery request device. In particular, the order processing unit 1320 processes a received delivery order (or delivery request) based on the shopping information and the destination information or buyer identification information provided from the order receiving unit 1310, and provides the processing results to the processing result reporting unit 1330.

More specifically, upon receiving the shopping information and the destination information, the order processing unit 1320 controls the output unit 1340 to output the shopping information so that the delivery staff may prepare for the delivery-requested bought goods. The order processing unit 1320 determines whether preparation for the goods corresponding to the shopping information of the buyer has been completed. The order processing unit 1320 may determine whether preparation for the delivery has been completed by checking whether a goods order number and a delivery preparation complete key are received, or whether a delivery preparation complete key is received. To this end, the delivery server may further include a user interface (not shown).

If the preparation for the delivery is completed, the order processing unit 1320 instructs delivery of the delivery-prepared goods. For example, if it is determined that the preparation for the delivery is completed, the order processing unit 1320 controls the output unit 1340 to print buyer address information on paper when the destination information is a buyer address. The printed paper is attached to a packing box of the goods ready to be delivered. However, if the destination information is place information preset in the affiliated store, the order processing unit 1320 controls the output unit 1340 to print an identification number (or phone number) of the buyer terminal or the buyer name on paper. The printed paper is attached to a packing box of the goods ready to be delivered.

If the destination information is place information preset in the affiliated store, upon completion of the preparation for the delivery, the processing result reporting unit 1330 sends a notification message indicating the completion of the preparation for the delivery to the buyer terminal. In this case, the destination information or the shopping information may preferably include identification information (e.g., phone number) of the buyer terminal. When the destination information is a customer address, the processing result reporting unit 1330 transmits an expected delivery time or the like to the buyer terminal in the form of a text message.

As is apparent from the foregoing description, according to an exemplary embodiment of the present invention, a payment is made based on the information about bought goods that a buyer has acquired using a buyer terminal during offline shopping, so the buyer does not need to carry the bought goods in person. As a result, the space for exhibiting goods in the offline store may be reduced and the incidental expenses for preparing for cards may also be reduced. In addition, when shipping or delivery information is registered in advance, reception of a shipping or delivery service for bought goods may be processed collectively.

While the invention has been shown and described with reference to certain exemplary embodiments thereof, it will be understood by those skilled in the art that various changes in form and details may be made therein without departing from the spirit and scope of the invention as defined by the appended claims and their equivalents.

For example, the offline shopping supporting technique and the delivery service supporting technique both proposed by an exemplary embodiment of the present invention may preferably be linked. In other words, the delivery service may preferably be performed after a payment on the bought goods is completed. Therefore, the buyer terminal provides the delivery information to the payment processing device (or the delivery request device) along with the information about bought goods it has collected for offline shopping, so the payment and delivery procedures may be performed collectively.

What is claimed is:

1. A method for supporting buying and selling of goods in an offline store by a payment processing device, the method comprising:
    identifying and connecting a buyer terminal based on short-range wireless communication;
    receiving, from the connected buyer terminal, destination information, buyer identification information, information about bought goods, event information and payment means information processed based on an unique information of the connected buyer terminal;
    determining a payment amount based on identification information corresponding to each of one or more bought goods and a purchase quantity corresponding to each of the one or more bought goods;
    obtaining other event information corresponding to an applicable event among events in the offline store based on the buyer identification information, the information about bought goods and the payment means information;
    identifying validity of the event information;
    determining a final payment amount by reflecting a price policy, that is determined based on the other event information and the identified valid event information, to the determined payment amount;
    transmitting a payment authorization request based on the final payment amount and the payment means information;
    receiving an authorized payment history in response to the payment authorization request;
    transmitting, to the connected buyer terminal, the authorized payment history; and
    transmitting, for a delivery request, the received destination information, the buyer identification information, the information about bought goods and the authorized payment history for the authorized payment, to a delivery server,
    wherein the information about bought goods includes the identification information corresponding to each of the one or more bought goods and the purchase quantity corresponding to each of the one or more bought goods, and
    wherein the events in the offline store are update by an additional event.

2. The method of claim 1, further comprising transmitting a message indicating completion of the delivery request to the buyer terminal.

3. The method of claim 1, further comprising:
    identifying, by the delivery server, a destination based on the destination information and the buyer identification information transmitted from the device;
    registering to deliver goods identification information for the one or more bought goods, which is included in the information about bought goods, and delivery goods determined by the purchase quantity corresponding to each of the one or more bought goods, to the identified destination; and
    after the registration is completed, transmitting a message indicating successful completion of delivery reception to the buyer terminal.

4. The method of claim 3, further comprising:
    after the registration is completed, outputting, by the delivery server, a document including information about the delivery goods and the identified destination.

5. The method of claim 4, further comprising:
    monitoring, by the delivery server, whether delivery preparation for the registered delivery goods is completed; and
    outputting a document including information about delivery goods corresponding to the delivery goods whose delivery preparation is completed, and a destination thereof.

6. The method of claim 1, further comprising upon detecting the buyer terminal entering the offline store, requesting the buyer terminal to install an application in consent with the buyer terminal.

7. A device for supporting buying and selling of goods in an offline store in an offline shopping support system, the device comprising:
    a receiver configured to:
        identify and connect a buyer terminal based on short-range wireless communication,
        receive, from the buyer terminal, destination information, buyer identification information, information about bought goods, event information and payment means information processed based on an unique information of the buyer terminal, and
        receive an authorized payment history in response to a payment authorization request;
    a controller configured to:
        determine a payment amount based on identification information corresponding to each of one or more bought goods and a purchase quantity corresponding to each of the one or more bought goods,
        obtain other event information corresponding to an applicable event among events in the offline store based on the buyer identification information, the information about bought goods and the payment means information,
        identify validity of the event information, and determine a final payment amount by reflecting a price policy, that is determined based on the other event information and the identified valid event information, to the determined payment amount; and a transmitter configured to:

transmit the payment authorization request based on the final payment amount and the payment means information, transmit, to the buyer terminal, the authorized payment history, and transmit, for a delivery request, the destination information, the buyer identification information, the information about bought goods and the authorized payment history for the authorized payment, to a delivery server, wherein the information about bought goods includes the identification information corresponding to each of the one or more bought goods and the purchase quantity corresponding to each of the one or more bought goods, and wherein the events in the offline store are update by an additional event.

8. The device of claim 7, wherein the transmitter transmits a message indicating completion of the delivery request to the buyer terminal.

9. The device of claim 7, wherein the delivery server comprises:

an order receiving unit configured to receive destination information and buyer identification information transmitted from the device;

an order processing unit configured to:

identify a destination based on the destination information and buyer identification information transmitted from the device, and register to deliver goods identification information for the one or more bought goods, which is included in the information about bought goods, and delivery goods determined by the purchase quantity corresponding to each of the one or more bought goods, to the identified destination; and a processing result reporting unit, after the registration is completed, configured to transmit a message indicating successful completion of delivery reception to the buyer terminal.

10. The device of claim 9, wherein the order processing unit outputs, after the registration is completed, a document including information about the delivery goods and the identified destination.

11. The device of claim 10, wherein the order processing unit is further configured to:

monitor whether delivery preparation for the registered delivery goods is completed, and output a document including information about delivery goods corresponding to the delivery goods whose delivery preparation is completed, and a destination thereof.

12. The device of claim 7, wherein the transmitter, upon detecting the buyer terminal entering the offline store, connect with the buyer terminal based on short-range wireless communication and request the buyer terminal to install an application in consent with the buyer terminal.

* * * * *